Dec. 18, 1934.　　　C. W. LAMBERT　　　1,985,041

AUTOMATIC VARIABLE PITCH PROPELLER

Filed Feb. 23, 1934　　　4 Sheets-Sheet 1

INVENTOR
Chandley W. Lambert.

INVENTOR:
Chandley W. Lambert.

Dec. 18, 1934.   C. W. LAMBERT   1,985,041
AUTOMATIC VARIABLE PITCH PROPELLER
Filed Feb. 23, 1934   4 Sheets-Sheet 3

INVENTOR
Chandley W. Lambert

Dec. 18, 1934.   C. W. LAMBERT   1,985,041
AUTOMATIC VARIABLE PITCH PROPELLER
Filed Feb. 23, 1934   4 Sheets-Sheet 4

INVENTOR:
Chandley W. Lambert.

Patented Dec. 18, 1934

1,985,041

UNITED STATES PATENT OFFICE 1,985,041

AUTOMATIC VARIABLE PITCH PROPELLER

Chandley William Lambert, Cleveland, Ohio

Application February 23, 1934, Serial No. 712,584

6 Claims. (Cl. 170—162)

The invention relates to automatic variable pitch propeller and is an improvement of applicant's Patent #1,913,123 dated June 6, 1933. The improvement necessitates only one compression spring instead of two balanced control springs, and reduces the travel of the pressure plate. Another feature is the use of power for the clutching or gear shifting means, instead of coupling the gear shifting device directly to the control plate. This feature is an improvement of the electromagnetic gear shift of Patent #1,924,061 dated Aug. 22, 1933, the present invention embodying improvements of practical design.

Similar parts are numbered the same in all figures of the drawings.

Figure 5:
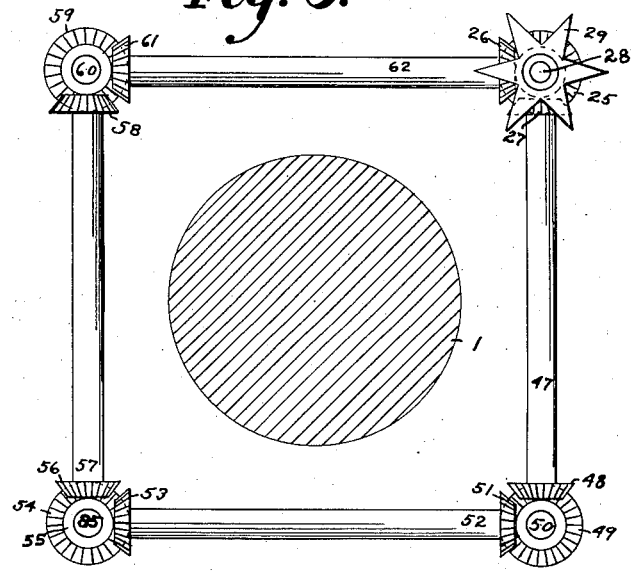
Figure 4:
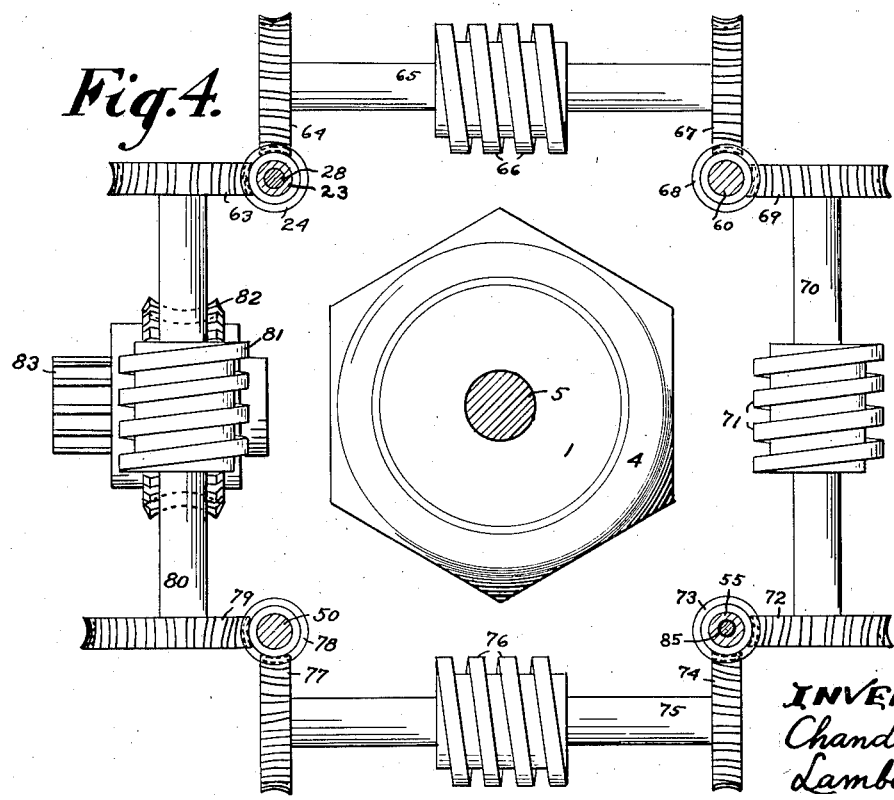

Fig. 4 is a transverse showing of the low speed side of the reduction gearing to the propeller blade shanks, looking rearwardly;—while, Fig. 5 is a transverse showing of the high speed side of the reduction gearing, looking forwardly. The twelve short shafts of the reduction gearing are enclosed within the hub, surrounding the power shaft and the barrels of hub,—corresponding to the twelve edges of a cube. The form shown in Fig. 4 is for a four bladed propeller, but any arrangement of the reduction gearing can be used without departing from the spirit of the invention. For a two bladed propeller, two of the slow speed worm gears of Fig. 4, as 66 and 76, would be omitted.

Figure 1:
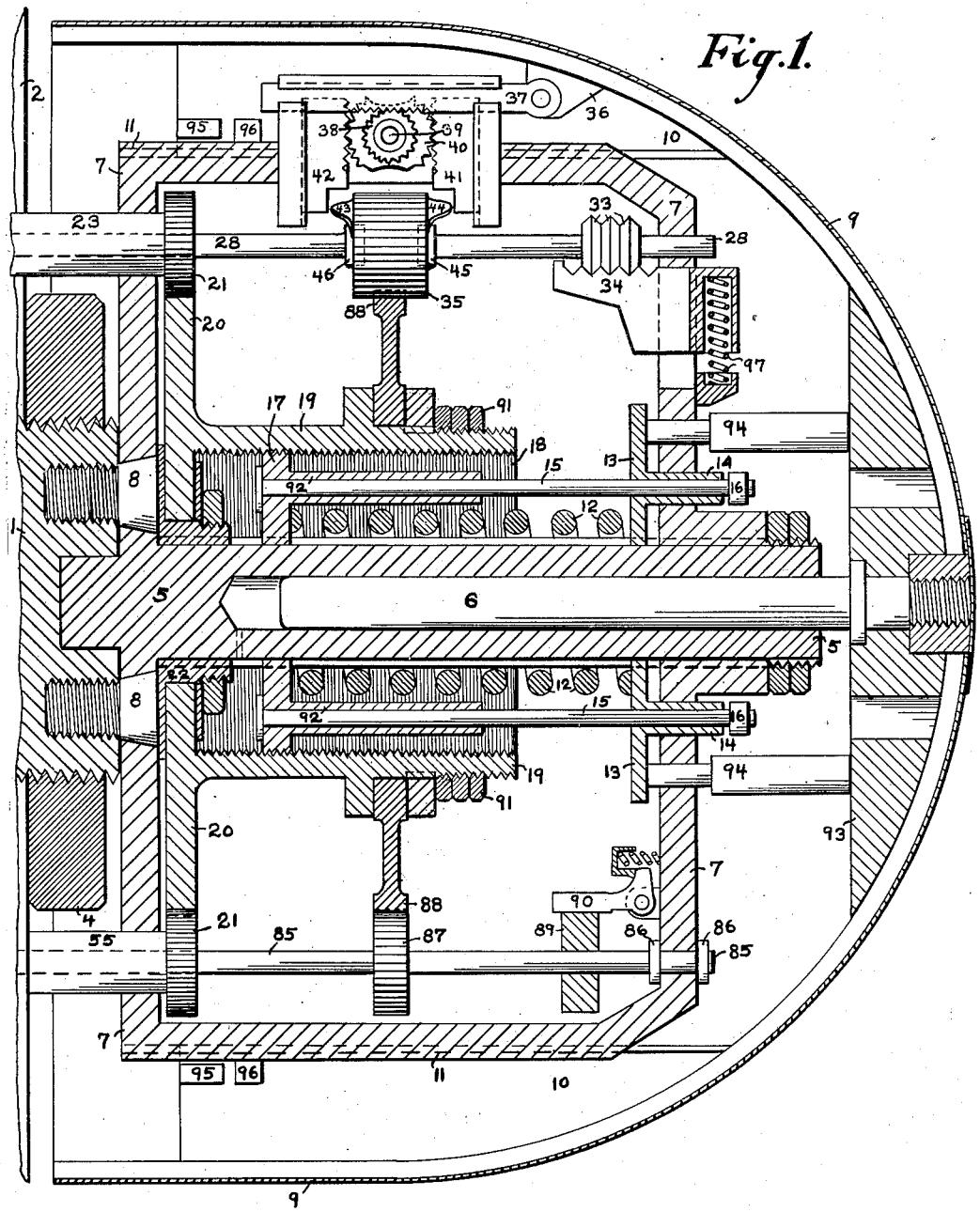
Fig. 1 is a longitudinal cross-section of the automatic control device.
Figure 6:
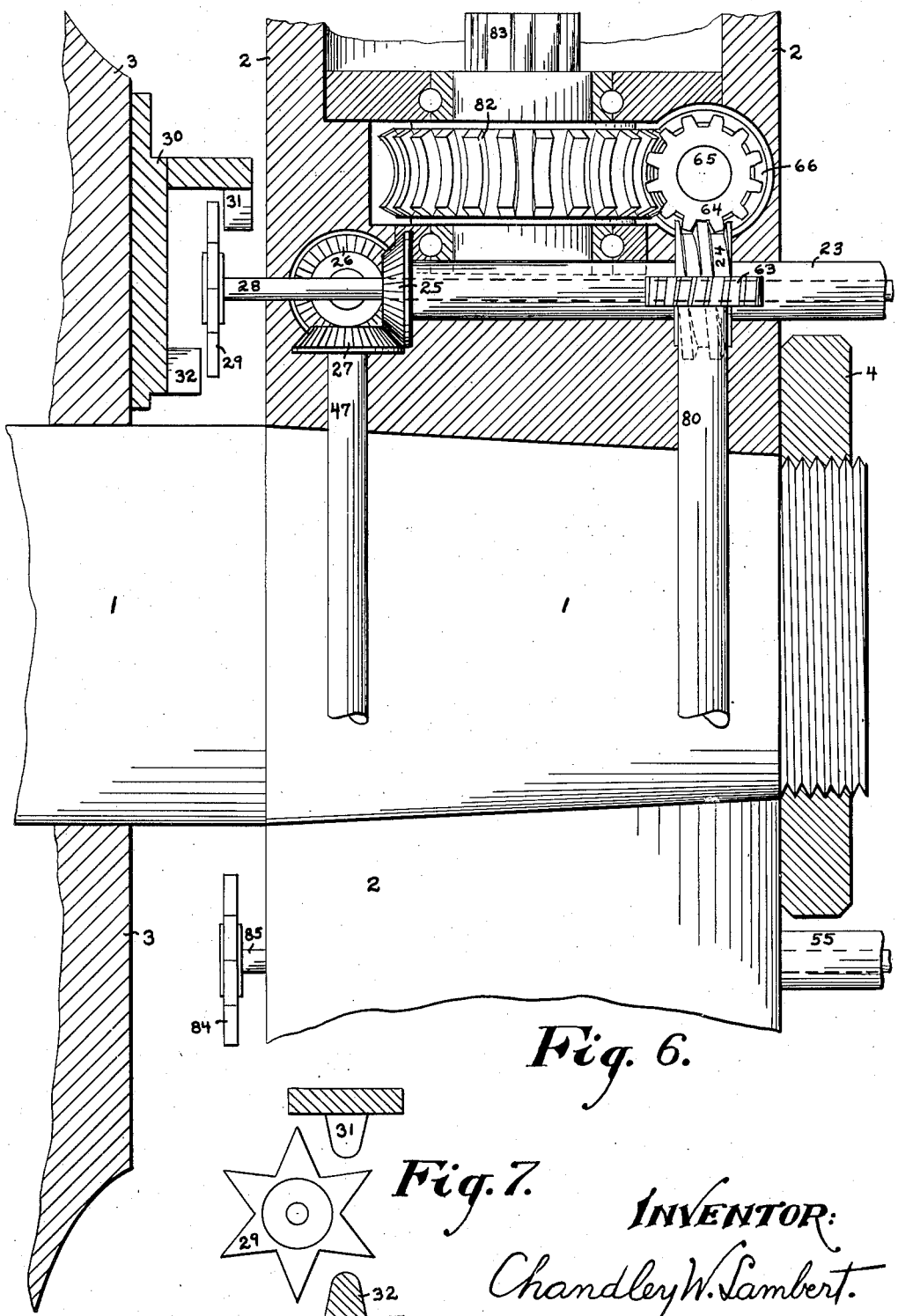

Fig. 6 is a longitudinal view, partly in section, of the power shaft and propeller hub, showing the reduction gears for one blade, and the connection to the automatic control of Fig. 1, of which Fig. 6 is a continuation.

Figure 7:
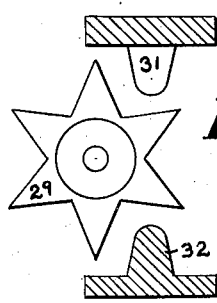

Fig. 7 is a transverse showing of the star wheel and the nonrotative lugs against which it reacts.

In the detailed description starting with Fig. 6 and then later progressing to Fig. 1, in Fig. 6, 1 is the main power shaft, 2 is the propeller hub secured to shaft 1 which projects from crank case 3, to which is secured the nonrotative bracket 30 with the lugs 31 and 32, which cause star wheel 29 to rotate in reverse directions for the purpose of rotating the blades into positions of decreased or increased pitch.

Star wheel 29 is secured to shaft 28 which has a limited longitudinal movement. Shaft 28 and tube 23 turn together; shaft 28 being splined in tube 23 on which bevel gear 25 is secured and meshes with bevel gears 26 and 27, see Fig. 5. To tube 23 is also secured worm gear 24 which meshes with gears 63 and 64 on slow speed shafts 80 and 65, on which slow speed worm gears 81 and 66, see Fig. 4, mesh with gear similar to 82, by which the motion is transmitted to splined hub or spindle 83 and to the shank of a propeller blade.

Through a tube 55, similar to tube 23, passes shaft 85 to which star wheel 84 is secured. Shaft 85 rotates independently of tube 55, and wheel 84 is always in intermittent contact with lug 31. This furnishes power for shifting shaft 28 and star wheel 29 at any time when shaft 1 is rotating, as shown in connection with Fig. 1.

Star wheel 84 by continuous intermittent contact with lug 31, furnishes power to gear 35, and this power is used only for longitudinally shifting shaft 28 and with it star wheel 29. Star wheel 29 furnishes power to the reduction gears for the purpose of rotating the blades to positions of greater or lesser pitch. Star wheel 29 contacts either lug 31 or 32 only when changes of air-speed, through the automatic control, necessitate corresponding changes of blade pitch. At all other times during periods of constant air speed, star wheel 29 contacts neither lug 31 nor 32; and tube 23 and the reduction gears do not rotate.

In Fig. 1 is shown a fragment of hub 2 which is secured to power shaft 1 by nut 4. Shaft extension 5 and frame 7 are secured to shaft 1 by spaced screws 8—8. Sliding extension 6 in shaft extension 5 is secured to frame 93 of pressure plate 9 which has supporting webs 10—10 on which flanges slide in grooves 11—11 of frame 7. Stops 95—95 on webs 10—10 may contact stops 96—96 on frame 7 to prevent excessive movement of plate 9, Figs. 1 and 2.

To extension 5 is secured flanged collar 22, on which gear 20 is free to rotate meshing with gears 21—21, on tubes 23 and 55. To gear 20 is secured tube 19 which has internal threads 18 cooperating with external threads on nut 17 which may slide on splined extension 5 with which nut 17 rotates. One end of compression spring 12 presses against nut 17 and the other end against control plate 13. The ends of tubes 14—14, secured to plate 13, may be contacted by stops 16—16 secured to sliding rods 15—15 which also pass through tubes 92—92 secured to nut 17. At the predetermined low pitch, stops 16—16 contact tubes 14—14. At the predetermined high pitch, tubes 92—92 contact plate 13.

Figures 2, 3:
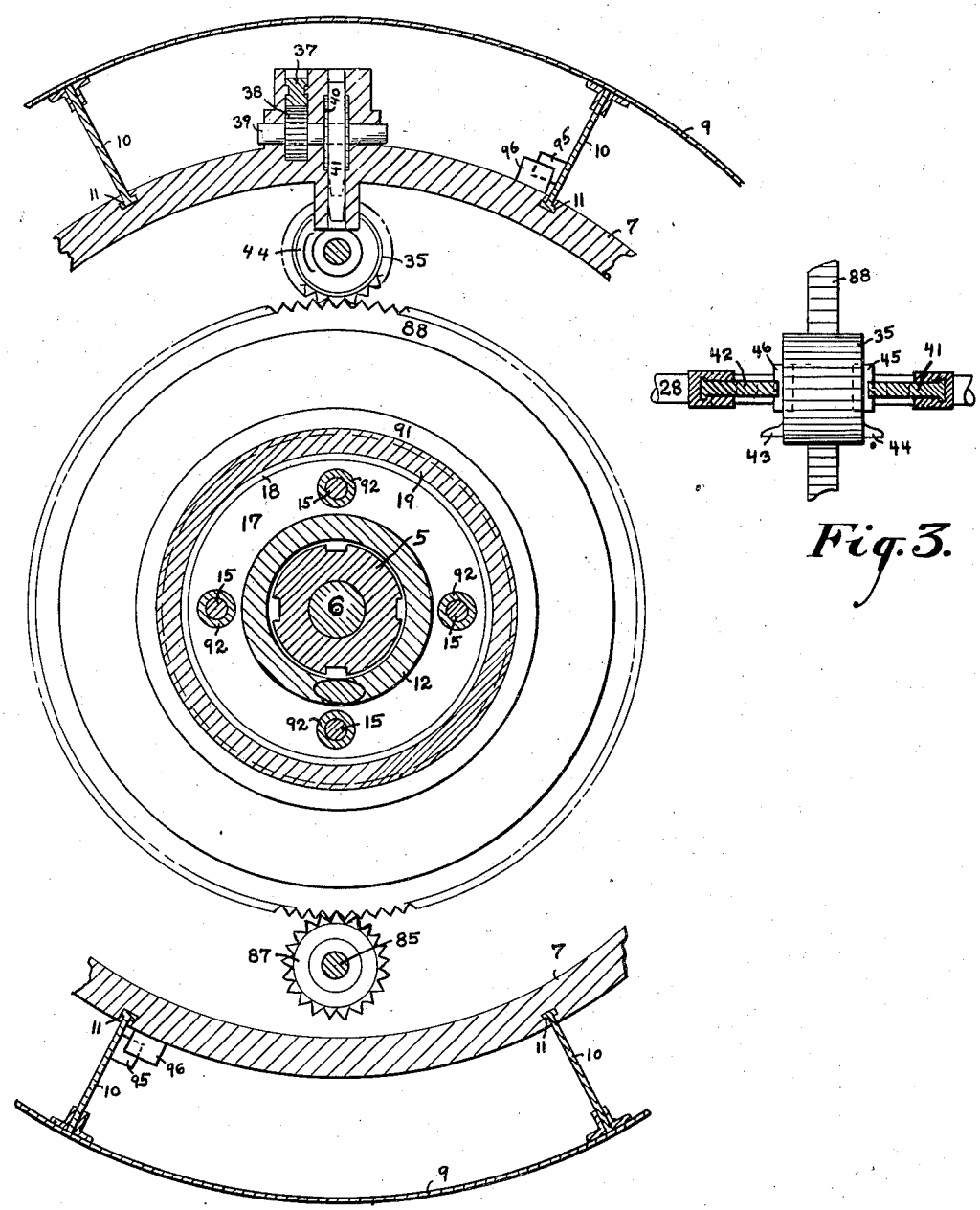
Fig. 2 is a transverse cross-section of the automatic control shown in Fig. 1.
Fig. 3 is a detail drawing, partly in section, of the automatically controlled, powered, gear shift shown in Figs. 1 and 2.

To pressure plate 9 or frame 10 are secured bracket 36 and rack 37, which meshes with gear 38 on shaft 39 to which sector gear 40 is also secured, see Fig. 2. Sector gear 40 meshes with vertical racks 41 and 42, the stepped ends of which may be contacted by cams 43 and 44, see Figs. 1—2—3, which are secured to gear 35 which is loose on shaft 28 between stops 45 and 46 which are secured to shaft 28. Gear 35 rotates independently of shaft 28.

To shaft 28 is secured grooved annular stop 33 which is contacted by notched bar 34 which slides vertically in guides on frame 7 and is held in contact with grooved stop 33 by compression spring 97.

Gear 35 rotates always in the same direction, but shaft 28 rotates in reverse directions. Gear 35 meshes with large gear 88 which is loose on tube 19, locknuts 91 preventing displacement by end motion. Gear 88 meshes with gear 87 on shaft 85, on which brake wheel 89 is also secured. Drag brake 90 makes only sufficient contact with brake wheel 89 to prevent spinning of gear 35.

Plate 13 is secured to frame 93 by pins 94—94 which have a limited longitudinal freedom of movement by sliding through frame 7. Plate 13 remains in the neutral position where shown in Fig. 1, only so long as the air pressure on plate 9 balances the pressure of spring 12 on plate 13. Increase of airspeed moves plate 13 to the left, decrease of airspeed moves plate 13 to the right. The movement of plate 13 and plate 9 is transmitted to racks 41 and 42 which control the position of gear 35 and star wheel 29 by the reaction of cams 43 and 44 on the stepped racks 42 and 41 respectively.

When gear 35 is in the neutral position as shown in Fig. 1, and plate 13 is also in the neutral or balanced position, cams 43 and 44 just pass between the lower steps of the racks 42 and 41. Movement of plates 13 and 9 toward the left, caused by an increase of airspeed, lowers rack 42 and raises rack 41. Cam 43 contacts the upper step of rack 42 and shifts gear 35 and shaft 28 to the right. Star wheel 29 now contacts lug 31 and rotates the reduction gears in a direction to increase the blade pitch. At the same time nut 17 moves to the right compressing spring 12 when the pitch of the propeller blades is increasing, and vice versa. The result is always to restore plate 13 to the neutral position and disengage gear 29 from either lug 31 or 32. This means that the tendency is for the angular pitch of the blades to closely follow any change of airspeed. The position of nut 17 is a relative measure of the blade pitch at any instant. The air pressure on plate 9 is likewise a measure of the air speed.

The action of gear 35 is continuous in direction but intermittent in speed and time. When star wheel 84 is in contact with lug 31, gear 35 rotates one sixth of a revolution. This movement takes place when star wheel 29 is on the opposite side of shaft 1 from bracket 30; or in other words when wheel 29 is out of contact with either lug 31 or 32. This is the instant when cams 43 and 44 pass the racks 42 and 41 and any shifting action takes place. This prevents jamming of wheel 29 against the side of either lug 31 or 32.

Fig. 2 shows a broken cross-section of the control mechanism in the region of gears 35 and 87. 7 is the frame, 9 the rearwardly extending skirt of the pressure plate. 6 the centrally located sliding shaft extension. 5 the shaft extension, 12 the compression spring, 15—15 the pitch limiting rods, 92—92 the high pitch limiting stops, 88 the large gear loose on tube 19, 35 the shifting gear.

In Fig. 3, gear 35 is shown and the relative position of stepped racks 41 and 42, and the cams 43 and 44 which are secured to gear 35.

In Fig. 4, looking rearwardly, it will be noticed that the slow speed worm gears 66—71—76—81 are mounted in the front side of the hub, each acting on a gear which is coaxial with a blade shank (as gear 82 of Fig. 6). The motion is received from 4 worm gears 24—68—73—78 which are secured to two tubes 23 and 55 (see Figs. 1 and 6), and two shafts 60 and 50, which are located parallel to power shaft 1 and equally spaced Figs. 4 and 5.

In Fig. 5, looking forwardlly, these four parallel tubes and shafts 23—50—55—60, terminate in bevel gears 25—49—54—59, to which they are secured, with each of which paired bevel gears mesh, as 48—51 meshing with gear 49. Gears 48 and 51 do not mesh with each other. Shafts 62 and 52 turn in toward shaft 1, while shafts 47 and 57 turn outward; and vice versa. Tubes 23 and 55 turn clockwise while shafts 50 and 60 turn counterclockwise; and vice versa.

In Fig. 4, worm gears 24 and 73 and gears 63—64—72—74 have right hand threads; and worm gears 68 and 78 and gears 67—69—77—79 have left hand threads.

Concerning the speed of operation of the automatic variable pitch, the reduction gear can be of such ratio that at normal engine speed, the time required to change from minimum to maximum blade pitch, or vice versa, is about the same as the least time required to change the air speed from maximum to zero, or vice versa, while in the air, say 6 to 10 seconds. With slower changes of air speed, the sensitive automatic control causes the gearing to follow by short, intermittent periods of action, any appreciable changes of airspeed.

Stalling is prevented. The engine and blades always operate at full efficiency regardless of airspeed.

The automatic variable pitch, as shown, is entirely mechanical, simple, balanced, rugged, efficient; shortens take off run; increases climbing angle and climbing speed; gives higher maximum airspeed; increases payload, revenue, and safety.

I claim;

1. An automatic variable pitch propeller, comprising; a movable pressure plate cooperating with a compression spring; a rotatable propeller blade shank; a splined nut cooperatively associated with said shank and said spring; pitch changing means comprising a non-rotating member and a cooperating rotating member; and reversible gearing cooperating with said blade shank and said nut; control means comprising independently powered cams and cooperating cam followers cooperatively associated with said pressure plate and said gearing; means limiting the extent of action of said pitch changing means.

2. A propeller shaft; a hub secured to said shaft; spaced rotatable propeller blade shanks cooperating with said hub; means for rotating said shanks in reverse directions relatively to said hub, comprising a splined nut and compression spring; means for measuring the extent of rotation of said shanks relatively to said hub; airspeed measuring means comprising a movable pressure plate and a cooperating compression spring; control means comprising gear control cams powered independently of said shank rotating means, cooperating with said airspeed measuring means and said shank rotating means.

3. A propeller shaft; a hub secured to said shaft; a rotatably mounted propeller blade shank cooperatively associated with said hub; means for rotating said shank; a movable pressure plate; a compression spring cooperating with said pressure plate; a movable nut cooperating with said shank rotating means and said compression spring; cams powered independently of said shank rotating means cooperating with said pressure plate for controlling the action in reverse directions of said shank rotating means; means cooperating with said nut for limiting the movement of said pressure plate.

4. In a propeller mechanism, a rotatable splined spindle coaxial with a propeller blade hub barrel, rotating means comprising reduction gears cooperating with said spindle, reversing means cooperating with a source of power and said gears, a splined nut cooperating with said gears, a compression spring cooperating with said nut, a pressure plate cooperating with said spring, limiting means cooperating with said nut and said plate, control means cooperating with said plate and said reversing means.

5. Means for rotating in reverse directions rotatably mounted spaced propeller blades by intermittent application of controlled power to said means, control means comprising a movable pressure plate and a cooperating compression spring, reversing means cooperatively associated with said control means, said reversing means cooperating with said blade rotating means during the interval of disassociation from said intermittent controlled power.

6. In a propeller mechanism, a non rotating member, a power shaft, a hub thereon, spaced rotatable blades secured thereto, reversible gearing cooperating therewith, a movable plate, a compression spring, a threaded tube, a splined nut, a reversing means cooperating with said non rotating member and said plate and said gearing, limiting means cooperating with said nut and said plate, substantially as specified.

CHANDLEY WILLIAM LAMBERT.